United States Patent
Phillips et al.

(10) Patent No.: US 6,542,266 B1
(45) Date of Patent: Apr. 1, 2003

(54) SYSTEM AND METHOD FOR PROVIDING BROADBAND DATA SERVICE

(75) Inventors: Bruce A. Phillips, Highlands Ranch, CO (US); Donald L. Brodigan, Broomfield, CO (US)

(73) Assignee: Qwest Communications International Inc., Denver, CO (US)

(*) Notice: Subject to any disclaimer, the term of this patent is extended or adjusted under 35 U.S.C. 154(b) by 0 days.

(21) Appl. No.: 09/339,597

(22) Filed: Jun. 24, 1999

(51) Int. Cl.[7] .............................................. H04B 10/20
(52) U.S. Cl. ..................... 359/118; 359/137; 370/395.1
(58) Field of Search ................................ 359/118, 125, 359/167, 135, 136, 137; 370/463, 422, 420, 409, 397, 399; 709/217, 218, 219; 379/221

(56) References Cited

U.S. PATENT DOCUMENTS

| | | | |
|---|---|---|---|
| 5,473,679 A | * 12/1995 | La Porta et al. ............ 379/201 |
| 5,519,707 A | * 5/1996 | Subramanian et al. ..... 370/94.2 |
| 5,541,917 A | * 7/1996 | Farris ........................ 370/60.1 |
| 5,583,863 A | * 12/1996 | Darr, Jr. et al. ............. 370/397 |
| 5,583,920 A | * 12/1996 | Wheeler, Jr. ................. 379/88 |
| 5,592,477 A | * 1/1997 | Farris et al. ................. 370/396 |
| 5,655,068 A | * 8/1997 | Opczynski ............. 395/182.02 |
| 5,848,068 A | * 12/1998 | Daniel et al. ................ 370/395 |
| 5,859,904 A | * 1/1999 | Huang ......................... 379/219 |
| 5,861,966 A | * 1/1999 | Ortel .......................... 351/125 |
| 5,872,645 A | * 2/1999 | Proctor ....................... 359/136 |
| 5,889,773 A | * 3/1999 | Stevenson, III ............. 370/352 |
| 5,907,552 A | * 5/1999 | Buckland et al. ........... 370/399 |
| 5,935,209 A | * 8/1999 | Budhraja et al. ........... 703/223 |
| 5,991,292 A | * 11/1999 | Focsaneanu et al. ........ 370/352 |
| 6,069,895 A | * 5/2000 | Ayandeh ..................... 370/399 |
| 6,075,630 A | * 6/2000 | Nishio ........................ 359/110 |
| 6,081,519 A | * 6/2000 | Petler ......................... 370/356 |
| 6,081,529 A | * 6/2000 | Christie ...................... 370/395 |
| 6,094,464 A | * 7/2000 | Ebringer et al. ............ 375/342 |
| 6,229,810 B1 | * 5/2001 | Gerszberg et al. .......... 370/401 |

* cited by examiner

*Primary Examiner*—Jason Chan
*Assistant Examiner*—Dalzid Singh
(74) *Attorney, Agent, or Firm*—Brooks & Kushman P.C.

(57) ABSTRACT

A system and method for providing broadband data service to a user site utilizes a plurality of well-known virtual paths between the host digital terminal and the network interface. The host digital terminal connects to a network that is connected to a plurality of data service providers. The plurality of well-known virtual paths allow several data service providers to share a single physical drop.

11 Claims, 6 Drawing Sheets

SYSTEM AND METHOD FOR PROVIDING BROADBAND DATA SERVICE

TECHNICAL FIELD

The present invention relates to systems and methods for providing broadband data service, including fiber to the neighborhood (FTTN), fiber to the curb (FTTC) and fiber to the home (FTTH)-(FTTx).

BACKGROUND ART

Fiber to the neighborhood (FTTN)/very-high bit rate digital subscriber line (VDSL) is presently used to connect a single data device in a residence or business with a single 10 Base T Port. As such, this limits the network to providing a customer with only access to a single data service provider (DSP) on a single physical drop. In the case of multiple data service providers, or in the case of remote utility meter reading, a separate VDSL drop is are required for each data device connected to the network.

Typically, the data service provider is connected to an asynchronous transfer mode (ATM) network. Fiber is used to carry information from the data service provider to a location near the customer residence or business. The last leg of the path from the data service provider to the customer is VDSL over twisted pair. Using an asynchronous transfer mode (ATM) virtual path allows the data service provider to control their own service applications, Internet protocol (IP) addresses, and security issues transparently to the VDSL broadband network.

The difficulty with the existing systems with a single customer premise equipment 10 Base T Interface is that they require a separate physical VDSL drop to the home for each different type of data service. Another difficulty is that each data service provider wants to control their own IP addresses which may include private IP addresses.

Attempts to control multiple IP addresses on a single drop with existing technologies becomes rather costly. Security also becomes an issue on a single physical drop. For the foregoing reasons, there is a need for a system and method for providing broadband data service to a customer site that simplifies the process of granting a customer access to a plurality of data service providers.

DISCLOSURE OF INVENTION

If is, therefore, an object of the present invention to provide a system and method for providing broadband data service to a user site that utilizes well-known virtual paths between a host digital terminal and the network interface at the customer or user site.

In carrying out the above object, a system for providing broadband data service to a user site is provided. The system comprises a network interface at the user site and a host digital terminal for connecting to a network that is connected to a plurality of data service providers. The host digital terminal communicates with the network interface and is configured to establish a plurality of well-known virtual paths between the host digital terminal and the network interface.

Preferably, the host digital terminal is configured such that for each well-known virtual path, the host digital terminal is operative to establish a corresponding network virtual path over the network to a corresponding data service provider. Further, for each well-known virtual path, the host digital terminal is operative to establish a permanent virtual circuit between that well-known virtual path and the corresponding network virtual path.

Advantageously, the use of multiple well-known virtual paths allows multiple data service provider's to be accessible to the end user, without compromising the data service provider's ability to control Internet protocol addresses and without compromising security in a cost effective manner. The system may include an optical network unit with a fiber connecting the host digital terminal to the optical network unit. Accordingly, a digital subscriber line connects the optical network unit to the network interface. The digital subscriber line preferably is a very-high bit rate digital subscriber line (VDSL). Of course, other XDSL digital subscriber line equipment may be suitable depending on the application. XDSL is a generic term for digital subscriber line equipment and services, including packet-based architectures, such as ADSL, IDSL, HDSL, SDSL, VDSL, and RADSL, and also including integrated services digital network (ISDN) lines. Alternatively, a fiber may connect the host digital terminal to the network interface, eliminating the need for the digital subscriber line.

In a preferred embodiment, the host digital terminal has information stored therein representing a physical port profile. The profile includes a plurality of entries corresponding to the plurality of well-known virtual paths. Each profile entry indicates a data service provider and a service handle.

Further, in a preferred embodiment, the host digital terminal further has information stored therein representing a network virtual path table. The table includes a plurality of entries, each table entry indicating a data service provider, a service handle, and at least one corresponding network virtual path.

Still further, in a preferred embodiment, the permanent virtual circuit between a well-known virtual path and the corresponding network virtual path is established when the data service provider and the service handle in the corresponding profile entry are the same as the data service provider and the service handle in the corresponding table entry. Advantageously, this allows the data service provider to provide a permanent virtual circuit (PVC) pool including a plurality of network virtual paths, such that the host digital terminal may connect the customer well-known virtual path with the first available network virtual path in the appropriate pool, with a permanent virtual circuit (PVC).

A customer premise equipment device may be connected to the network interface, with the device having a plurality of ports corresponding to the plurality of well-known virtual paths. As such, different data devices may be connected to the different ports on the customer premise equipment device. At least one of the ports may be connected to a utility meter, such as an electric meter, a gas meter, or a water meter to provide remote utility meter reading.

Further, in carrying out the present invention, a system for providing broadband data service to a user site is provided. The system comprises a network interface at the user site, and a host digital terminal for connecting to a network that is connected to a plurality of data service providers. The host digital terminal communicates with the network interface and is configured to establish a plurality of well-known virtual paths between the host digital terminal and the network interface.

The host digital terminal is configured such that for each well-known virtual path, the host digital terminal is operative to establish a corresponding network virtual path over the network to a corresponding data service provider. Further, the host digital terminal is configured to establish a permanent virtual circuit between the well-known virtual path and the corresponding network virtual path.

The host digital terminal has information stored therein representing a physical port profile. The profile includes a plurality of entries corresponding to the plurality of well-known virtual paths. Each profile entry indicates a data service provider and a service handle. Further, the host digital terminal further has information stored therein representing a network virtual path table. The table includes a plurality of entries. Each table entry indicates a data service provider, a service handle, and at least one corresponding network virtual path.

Preferably, the permanent virtual circuit between a well-known virtual path and the corresponding network virtual path is established when the data service provider and the service handle in the corresponding profile entry are the same as the data service provider and the service handle in the corresponding table entry.

Still further, in carrying out the present invention, a method for providing broadband data service to a user site in which a host digital terminal is connected to a network connected to a plurality of data service providers is provided. The host digital terminal is in communication with a network interface at the user site. The method comprises establishing a plurality of well-known virtual paths between the host digital terminal and the network interface. The well-known virtual paths are established such that the plurality of data service providers may communicate with the network interface along different well-known virtual paths.

Preferably, the method further comprises establishing a plurality of permanent virtual circuit pools. Each pool connects a corresponding data service provider to the host digital terminal. Further, each pool includes at least one virtual network path.

The method preferably further comprises establishing a physical port profile and establishing a network virtual path table. The profile includes a plurality of entries corresponding to the plurality of well-known virtual paths, with each profile entry indicating a data service provider and a service handle. The table includes a plurality of entries, with each table entry indicating a data service provider, a service handle, and at least one corresponding permanent virtual circuit pool. Preferably, a permanent virtual circuit is established between a well-known virtual path and the corresponding permanent virtual circuit pool when the corresponding profile entry and the corresponding table entry have a matching data service provider and service handle. Further, preferably, the permanent virtual circuit between the well-known virtual path and the permanent virtual circuit pool is established as a permanent virtual circuit between the well-known virtual path and a first available network virtual path of the corresponding permanent virtual circuit pool.

The advantages associated with embodiments of the present invention are numerous. For example, systems and methods of the present invention provide network capability to support multiple permanent virtual circuits (PVC) over a single physical drop to a customer premise equipment data device that supports multiple 10Base T Ports. As such, multiple data service providers, such as remote reading of electric, gas, and water meters, in addition to an Internet service provider may be connected to the customer site with a single physical drop. That is, the data service providers have private-line-like access to their service application across the ATM/VDSL network, or ATM network with fiber to the home.

The above object and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
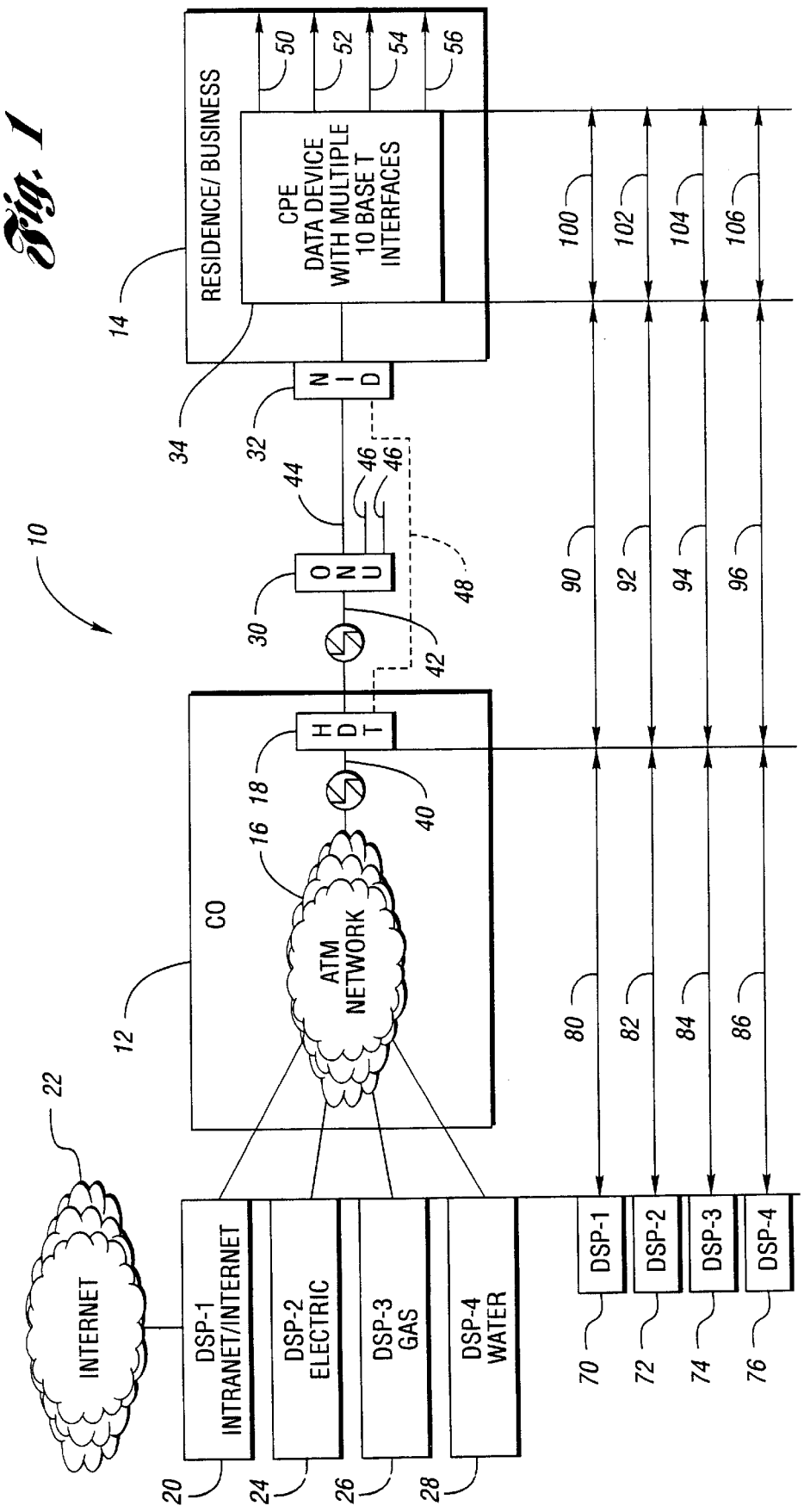
FIG. 1 is a system of the present invention utilizing ATM/VDSL to provide a plurality of well-known virtual paths between the HDT and network interface.

FIG. 1 is a block diagram of a fiber to the neighborhood (FTTN)/very-high bit rate digital subscriber line (VDSL) embodiment of the present invention that may be used to implement multiple ATM permanent virtual circuit (PVC) connections between the data service providers (DSPs) and the customer premise equipment (CPE) device supporting multiple 10 Base T Ports on a single FTTN/VDSL drop. The system is generally indicated at 10, with a central office 12 and residence or business 14. Central office 12 provides connections to network 16. Network 16 is preferably an asynchronous transfer mode (ATM) network. Of course, other suitable networks may be used as it is appreciated by one of ordinary skill in the art. Central office 12 also includes a host digital terminal (HDT) 18. HDT 18 provides communication between ATM network 16 and a number of customer sites 14. ATM network 16 has connections to a plurality of data service providers. For example, an intranet/Internet data service provider is indicated at 20, while an electric meter reading DSP is indicated at 24. A gas meter reading DSP is indicated at 26, and a water reading DSP is indicated at 28.

Although one HDT 18 is shown, it is appreciated that any number of HDTs may be connected to ATM network 16 to service one or more metropolitan areas. Further, each HDT 18 is connected to a number of optical network units (ONU), a single ONU 30 being shown for convenience. As shown, each optical network unit (ONU) 30 connects to a number of network interface devices (NID) 32.

Network interface 32 connects to a customer premise equipment (CPE) data device 34, with multiple 10 Base T interfaces. Preferably, ATM network 16 connects to HDT 18 with fiber 40. Further, HDT 18 preferably connects to ONU 30 with fiber 42. ONU 30 converts the light signals traveling along fiber 42 into appropriate signals for digital subscriber line (DSL) 44. Digital subscriber line 44 is preferably a twisted pair, such as a copper twisted pair, and is implemented as a form of XDSL. Preferably, DSL 44 is implemented as VDSL.

As shown, each ONU 30 serves a number of DSLs, with additional DSLs indicated at 46. In the alternative, a fiber may be used to connect HDT 18 directly to network interface 32. As such, VDSL (or any other XDSL) is not required for the last leg of communication because the fiber runs directly to the home. As VDSL is preferably used over a twisted pair, synchronous optical network (SONET) or another suitable modulation technique may be used for fibers 40 and 42, or fiber 48. Customer premise equipment (CPE) data device 34 has a plurality of ports, preferably implemented as 10 Base T Ports 50, 52, 54, and 56.

In accordance with the present invention, the use of multiple well-known virtual paths between HDT 18 and network interface 32 allows a plurality of data service providers to access corresponding ports 50, 52, 54, and 56. As best illustrated at the bottom of FIG. 1, communication from each data service provider 70, 72, 74, and 76 (at the bottom, equivalent to 22, 24, 26, and 28 at the top) to the HDT is over an ATM network virtual path of a permanent virtual circuit (PVC) pool 80, 82, 84, and 86. HDT 18 communicates with network interface 32 along corresponding well-known virtual paths 90, 92, 94 and 96. CPE data device 34 connects each well-known virtual path 90, 92, 94 and 96 to a corresponding different physical port 100, 102, 104 and 106 (at the bottom, equivalent to 50, 52, 54 and 56 at the top).

In accordance with the present invention, well-known virtual paths between HDT 18 and network interface 32 are utilized on a single physical carrier to allow CPE data device 34 to route each well-known virtual path to a different physical port. As such, multiple DSPs may communicate with multiple data devices at the residence or business 14, without compromising controllability (such as control of IP addressing), or security.

In accordance with the present invention, the FTTC/VDSL broadband network provides multiple ATM PVC connections between multiple DSPs and a customer CPE device supporting multiple 10 Base T ports on a single FTTN/VDSL drop. CPE data device 34 has a different well-known virtual path identifier/virtual channel identifier (VPI/VCI), (that is, virtual path) assigned to each 10 Base T port. Each well-known VPI/VCI provides a virtual path between the CPE data device through the customer's physical port on the ONU 30 to the HDT 18. For each DSP, a soft permanent virtual circuit (PVC) is established between the well-known VPI/VCI and the first idle DSP PVC (in the pool) based on the provisioned customer physical port profile and the VPI/VCI table in the HDT. The ONU typically supports 16 to 32 physical VDSL ports to the residence/business.

Data Service Providers are connected to the ATM Network from their own ATM Switches. DSP 20 may provide its own intranet services as well as providing access to the Internet 22. Electric, gas and water meter reading services are also connected to the ATM Network. Each DSP will establish a PVC pool from their ATM switch through the ATM Network to HDT 18. The number of PVCs in each pool or range of PVC VPI/VCI is determined by the DSP. One PVC is required for each customer data device port that will be used for the DSP Service.

Figure 2:
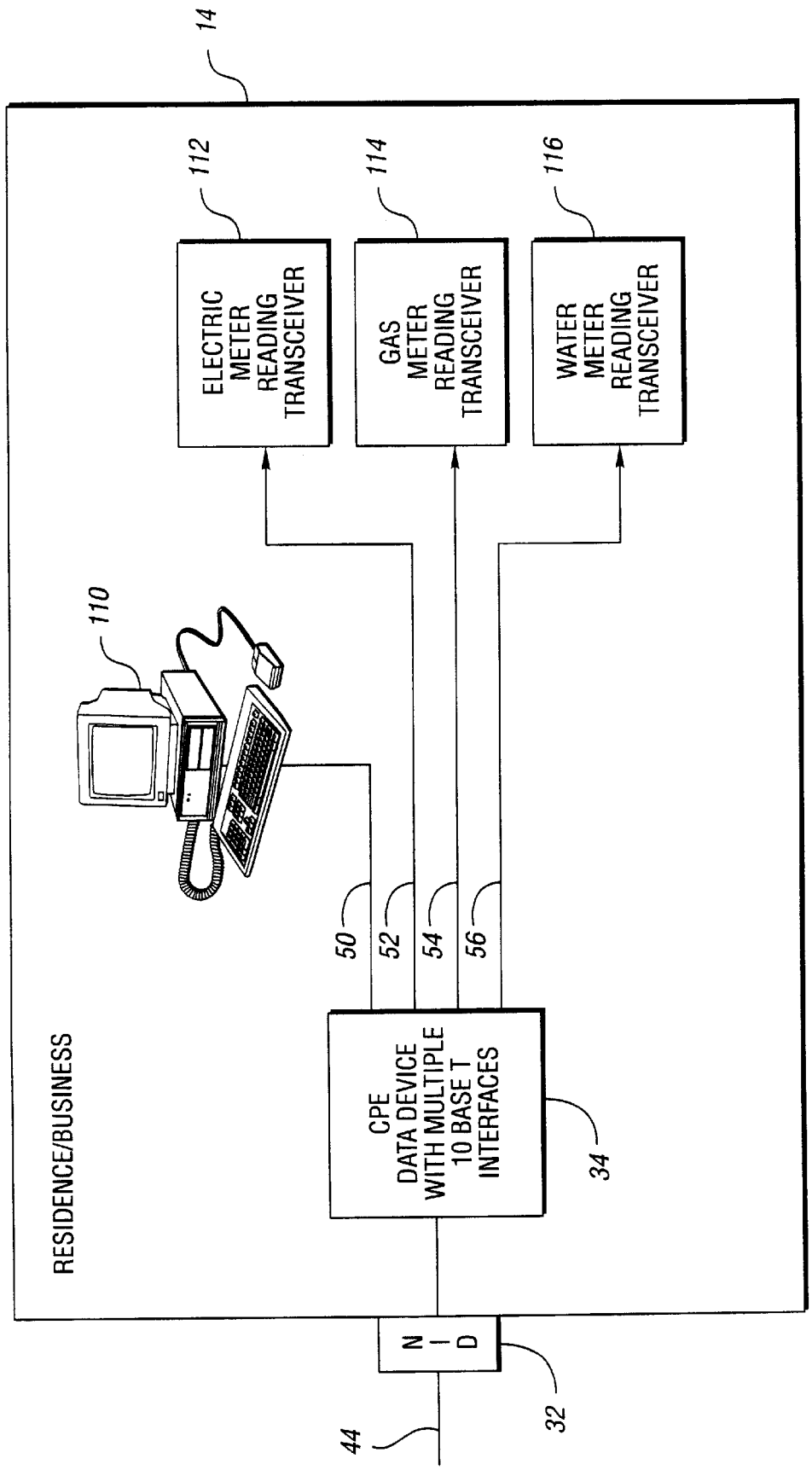
FIG. 2 is an enlarged view of the residence/business portion of the system in FIG. 1.

Referring to FIG. 2, CPE data device 34 at the residence/business has four 10 Base T ports. CPE data device 34 is connected to the NID 32 with a single twisted pair. Customer PC 110 is connected to the first 10 Base T port 50 of the CPE Data Device 34. This first virtual path will connect through the VDSL broadband network in FIG. 1 to DSP-1, providing access to intranet and Internet data services. Electric meter reading transceiver 112 is connected to the second 10 Base T port 52 on CPE Data Device 34. This second virtual path will connect through the VDSL broadband network in FIG. 1 to DSP-2, providing remote real time electric meter reading. Gas meter reading transceiver 114 is connected to the third 10 Base T port 54 on CPE Data Device 34. This third virtual path will connect through the VDSL broadband network in FIG. 1 to DSP-3, providing remote real time gas meter reading. The water meter reading transceiver 116 is connected to the fourth 10 Base T port 56 on CPE Data Device 34. This fourth virtual path will connect through the VDSL broadband network in FIG. 1 to DSP-4, providing remote real time gas meter reading.

Figure 3:
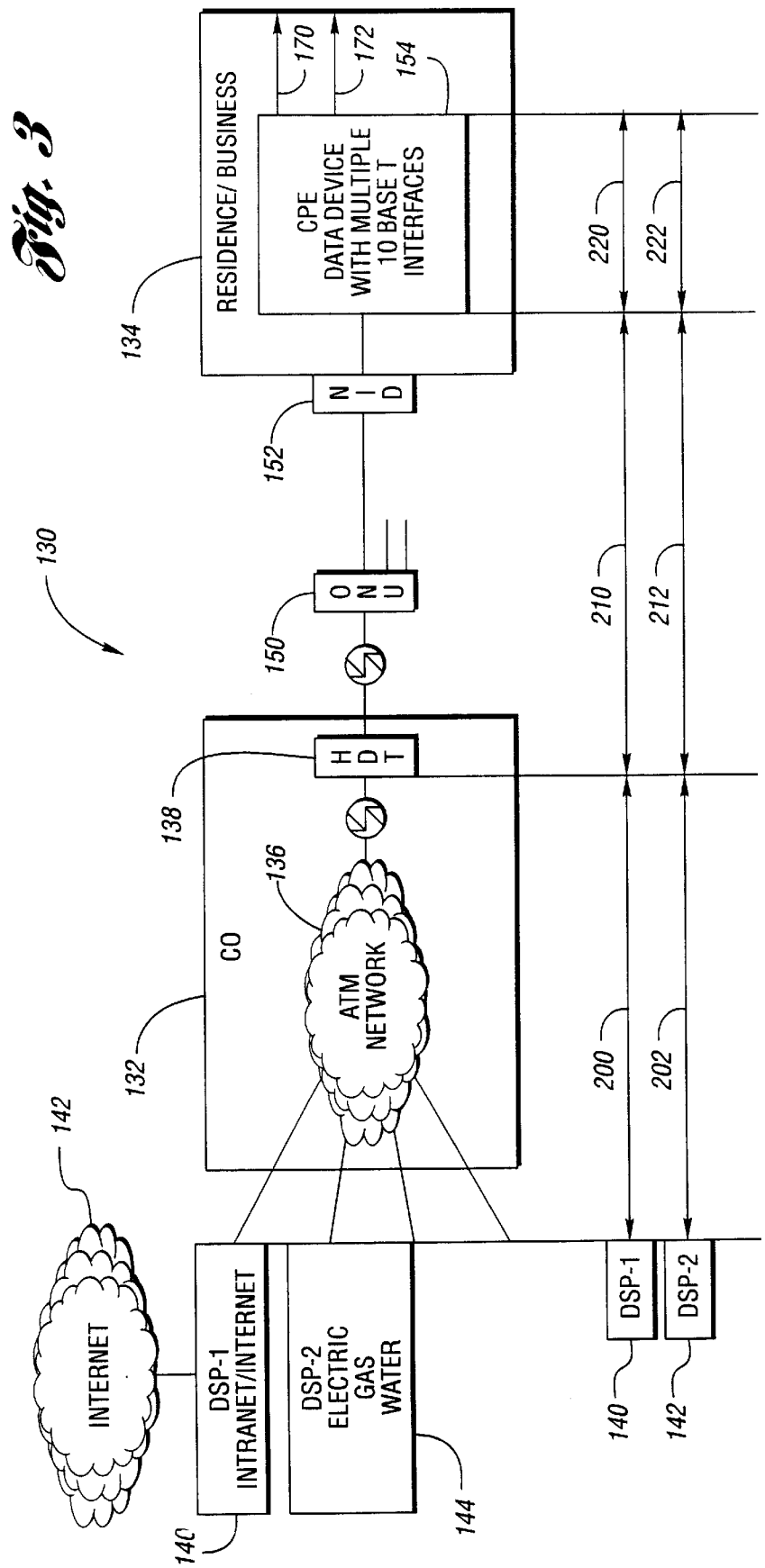
FIG. 3 is another system of the present intention showing a single DSP that provides multiple utilities to the residence/business.

Referring to FIG. 3, an alternative system of the present invention is generally indicated at 130. System 130 includes central office 132 for providing data service to residence/business 134. Similar to system 10 of FIG. 1, system 130 of FIG. 3 includes an ATM network 136 communicating with a host digital terminal (HDT) 138. HDT 138 communicates with optical network unit (ONU) 150. ONU 150 is connected to network interface (NID) 152. CPE data device 154 has first and second 10 Base T ports 170 and 172, respectively.

Data service provider 140 communicates with 10 Base T port 170, and data service provider 144 communicates with 10 Base T port 172. DSP 140 may provide intranet services in addition to access to the Internet 142. DSP 144 provides remote electric, gas, and water meter reading. The data service providers are able to simultaneously communicate with CPE device 154 because multiple well-known virtual paths are provided from HDT 138 to NID 152, in a similar manner as that described in FIGS. 1 and 2. That is, each DSP (140 and 144) communicates with HDT 138 over a permanent virtual circuit (PVC), which may be one PVC of a pool of PVCs for a particular DSP. In turn, HDT 138 communicates with NID 152 over a plurality of well-known virtual paths.

More particularly, as shown at the bottom of FIG. 3, first and second data service providers 190 and 192, respectively, (at the bottom and 140 and 144, respectively, at the top of FIG. 3) each communicate over a different virtual path identifier/virtual channel identifier (VPI/VCI) over the ATM network, as shown at 200 and 202, respectively. Well-known virtual paths 210 and 212, respectively, establish private-line-like connections between HDT 138 and 10 Base T ports 220 and 222, respectively, with each well-known virtual path being connected to the appropriate ATM PVC defined by the corresponding VPI/VCI, by a soft permanent virtual circuit (PVC) with an HDT 138.

Figure 4:
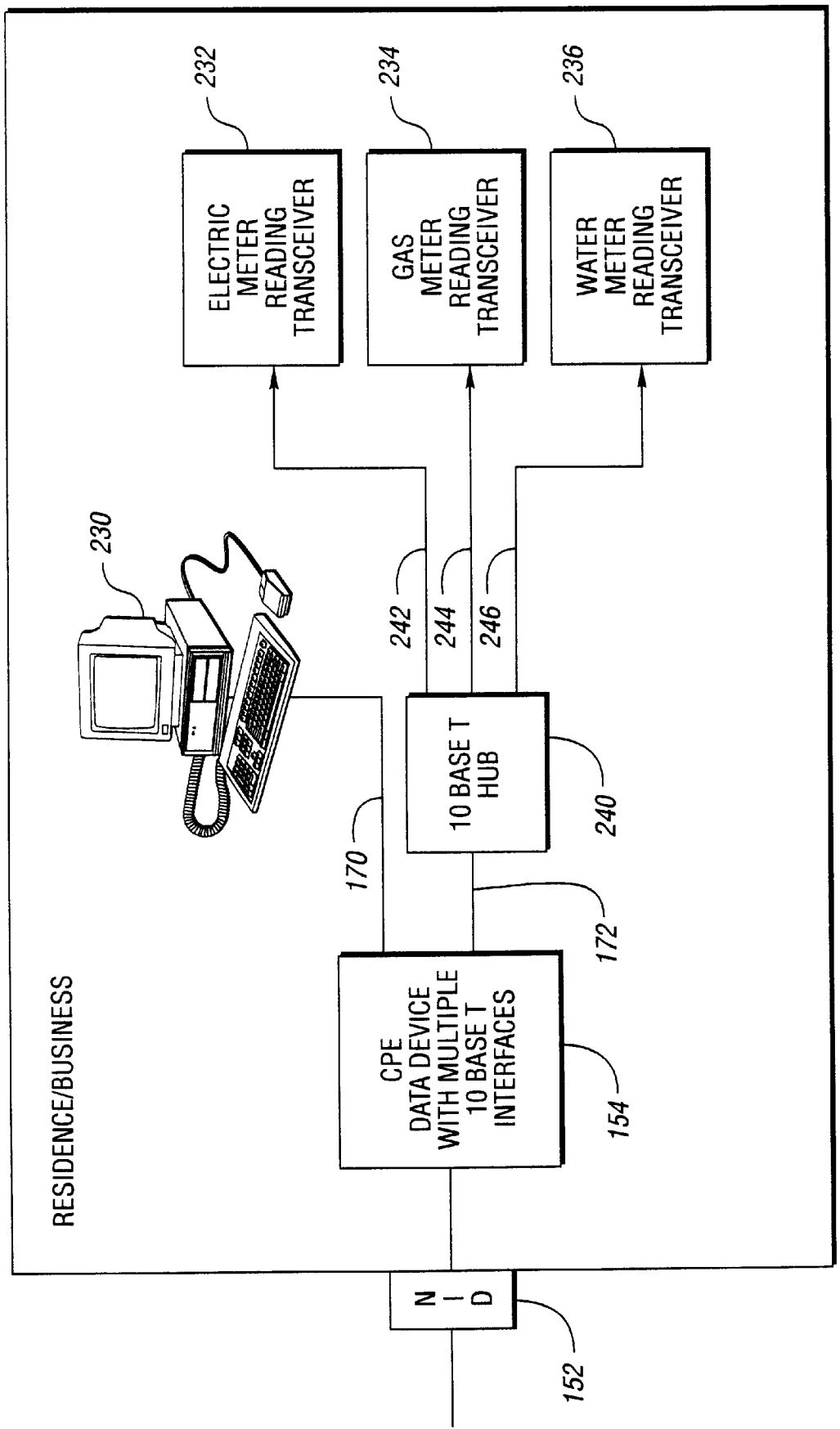
FIG. 4 is an enlarged view of the residence/business portion of the system in FIG. 3.

Referring to FIG. 4, CPE Data Device 154 located at the residence/business is equipped with two 10 Base T ports. CPE Data Device 154 is connected to NID 152 with a single twisted pair. Computer 230 is connected to the first 10 Base T port 170 of the CPE Data device 154 in the same manner as described for FIG. 2. The 10 Base T Hub 240 is connected to the second 10 Base T port 172 on the CPE Data Device 154. A single ATM virtual path is established between the CPE Data Device and DSP 144 in FIG. 3. Port 242 on 10 Base T Hub 240 is connected to electric meter reading transceiver 232. Port 244 on 10 Base T Hub 240 is connected to gas meter reading transceiver 234. Port 246 on 10 Base T Hub 240 is connected to water meter reading transceiver 236.

The manufacturer provides a unique Media Access Control (MAC) address for each transceiver. The MAC address is like a serial number for each device and allows the DSP to track each device to a specific installed location. When the meter reading transceiver is attached to a provisioned port on the CPE Data Device 154 and powered on it will send the MAC address in a log-on message to the DSP over the network ATM virtual path. The DSP will dynamically assignee this device an IP Address.

With the IP address assigned and associated with the MAC address of this transceiver, the DSP can now poll this meter reading device at any time. IP addresses are transparent to the VDSL broadband network. The DSP has total control of service including security and IP addressing. With each transceiver having its own IP address and being polled by the same DSP (in this case but not in FIGS. 1 and 2) there is only a requirement for a single ATM virtual path across the FTTN/VDSL network (for meter reading plus another path for DSP-1) when using a 10 Base T Hub.

Figure 5:
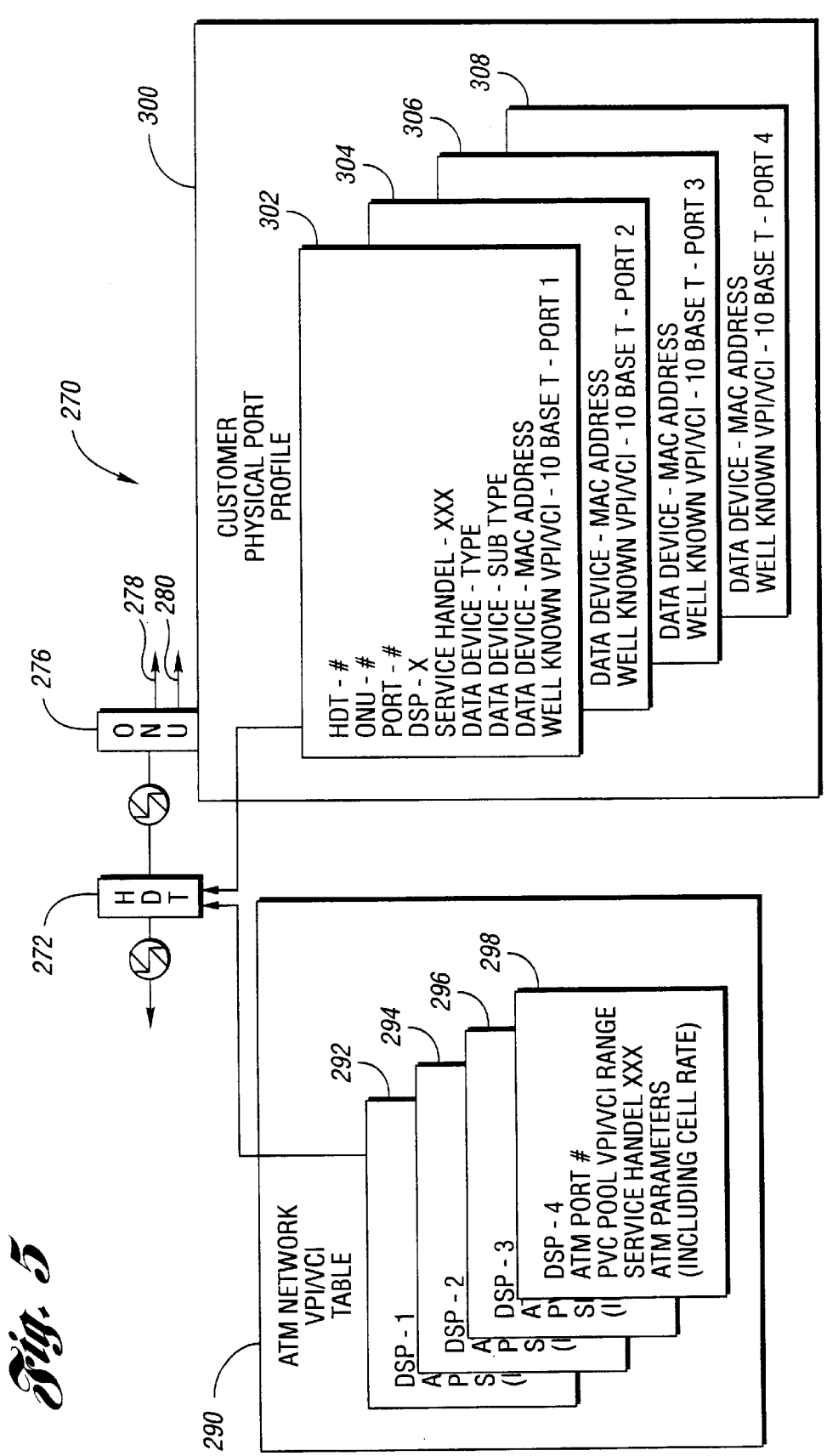
FIG. 5 illustrates the use of a customer physical port profile and ATM network VPI/VCI Table.

FIG. 5, illustrates a portion of the system at 270 including the VDSL Broadband ATM VPI/VCI table 290 and customer physical port profile 300 that enables multiple DSP services on a single physical drop to a single data device. The FTTN/VDSL network is responsible for provisioning the ATM Network VPI/VCI table and the customer physical port profile. Each DSP will need one PVC in its PVC pool on the HDT for each customer CPE Data Device port that it wants to use for service. ATM parameters are specific to the DSP requirements. One HDT 272 and one ONU 276 are shown for convenience. Multiple HDTs will service a metropolitan area. Each HDT will support multiple ONUs.

ONU 276 will support multiple customer physical drops (for example, 278 and 280). Typical ONUs may support 16 to 32 physical ports, with the HDT supporting 1 to 64 ONUs. Coax or twisted pair may be used between the ONU and the residence/business. Further, in fiber to the home, the ONU may be replaced by a multiplexor. The physical FTTX/VDSL customer drop is identified using the HDT number, ONU number and the Port number on the ONU.

ATM Network VPI/VCI Table 290, includes a plurality of entries, (292, 294, 296, 298) with each entry preferably including the following:

a) Unique DSP Identification (example—DSP-1).

b) ATM Network Port # (HDT 272 may support several high speed ATM User-Network Interfaces (UNI) between the HDT and the ATM Network.

c) PVC Pool VPI/VCI range provisioned ATM UNI interface, for example, VPI-1/VCI-2000 to VPI-1/VCI-2099, which provides up to 100 active ports to customer CPE Data Devices.

d) A unique service handle, preferably alphanumeric. The service handle identifies the modem pool. When a customer's physical port profile is provisioned and connected to the network with this service handle (and DSP), it will establish a soft PVC in the HDT between the customer's well-known port VPI/VCI (virtual path) to the first available VPI/VCI in the PVC Pool.

e) ATM parameters will be provisioned that are specific to the DSP requirements for the PVC pool. Examples of some of the available parameters are Constant Bit Rate (CBR), Variable Bit Rate (VBR), Unspecified Bit Rate (UBR) and Cell Rate. For meter reading the cell rate would be very low and may use UBR type bit rate.

Each entry (302, 304, 306, 308) in the customer physical port profile 300 is provisioned in the HDT and is unique based on each of the parameters entered. Multiple entries can be provisioned to a single physical customer drop, up to the number of ports supported on the CPE data device. Each device will have a device type and sub-type that identifies how many ports it supports. Each device also has a fixed MAC address from the manufacturer that will be used in each entry. FTTC can support multiple devices but the number of entries per single CPE device (MAC) is still based on the device type and sub-type. The MAC address and the Device Type and Sub-type are sent in a log-on message to HDT 272 when the CPE device is connected to the drop and powered on.

Each entry in the customer physical port profile 300 preferably includes the following:

a) HDT number.

b) ONU number.

c) Port number. Each Port provides for one physical FTTX/VDSL drop. The drop is then connected to the residence or business).

d) DSP-X (This field is used to uniquely identify the DSP service being provisioned on this profile. When a customer has multiple DSP providers for the same CPE data device, only the DSP that is identified in the profile entry for that port will be allowed to change or delete the service).

e) Service handle (The service handle is unique to the DSP and is used to identify the PVC pool that was provisioned in the ATM Network VPI/VCI Table).

f) Data device—type (Device type and device sub-type identify how many 10 Base T ports the customer CPE data device will support. This also determines how many profile entries may be provisioned. There can only be one profile for each port for any CPE data device.

g) Data device—sub-type.

h) Data device—MAC address (Each data device has a MAC address assigned to it when it is manufactured. The MAC address is used when the CPE Data Device logs onto the network. This MAC address will match the MAC address provisioned in the network customer physical port profile).

i) Well Known VPI/VCI—10 Base T port (Each 10 Base T port that is supported on a specific device starts with one and ends with the number for the highest supported on that device type. For example, a device with four 10 Base T ports numbers the ports as 1 to 4. Each port will have its own unique VPI/VCI. All Ports are not required to be provisioned at initial customer service activation.

In operation, a preferred embodiment of the present invention is best illustrated in FIG. 1. The customer connects their CPE data device 34 to the NID 32 and powers the CPE by connecting to a power service. The data device will send a log-on message to the HDT 18, and included in this log-on message is the MAC address of the data device 34 and the device type and sub-type code.

The HDT 18 receives the log-on message and looks at the customer physical port profile that was established using FIG. 5. At this point, the record is matched to the MAC address, device type and sub-type, HDT#, ONU#, and PORT# in the customer physical port profile. Four entries have been established for this data device and each device port has its own well-known VPI/VCI (in this example), that is, virtual path. Each profile entry will establish a soft PVC between the well-known VPI/VCI (virtual path) to the first idle DSP PVC in the DSP PVC pool. At this point, the network has established an ATM virtual path to all four different DSP with the last three being electric, gas and water meter reading DSP.

The Electric company provides the remote electric meter reading transceiver for the residence/business. The transceiver has its own MAC address that was provided by the manufacturer (MAC addresses are used like a serial number for each device). When the transceiver is plugged into the second port of CPE Data Device 34 of FIG. 2, it will send its MAC address to DSP-2 (24). DSP-2 (24) will then assign an IP address to this transceiver MAC address. This IP address will be used by the DSP to poll the customer's electric meter transceiver at any time. The gas and water meter transceivers function in the same manner as specified for the electric meter. Thus, all four 10 Base T applications attached to the customer CPE data device in FIGS. 1 and 2 provide bi-directional communication between the corresponding DSP and CPE meter over a physical VDSL Broadband drop and a network ATM virtual path.

The embodiment in FIG. 3 shows a CPE data device 154 that only supports two 10 Base T Ports, limiting the customer to two entries in the port profile. The electric, gas and water meter reading service is performed by the same DSP, requiring only one PVC virtual path between the DSP-2 (144) and the customer CPE Data Device 154. Port #2 is provisioned in the customer physical port profile for DSP meter reading service, while port #1 is provisioned for DSP 140.

HDT 138 will receive the log-on message and look at the customer physical port profile that was established using FIG. 5. At this point the customer physical port profile is matched to the MAC address, device type and sub-type, HDT#, ONU#, and PORT#. Each port profile entry will have a well-known VPI/VCI for each port. A soft PVC will be established between the well-known VPI/VCI to the first idle PVC in the DSP PVC Pool and is based on the service handle associated with a port in the customer physical port profile. At this point, the VDSL network has established an ATM Virtual Path to the electric, gas and water meter reading DSP.

Each meter transceiver has its own MAC address that is assigned to it when it is manufactured. When it is connected and powered on it will send a log-on message to the DSP over the ATM virtual path established between the CPE Data Device 154 and the DSP-2 (144). The DSP-2 (144) will preferably use a Dynamic Host Configuration Protocol (DHCP) to assign IP address to each of the transceiver MAC addresses. At this point, the DSP can poll the electric, gas and water meters at any time over a single ATM virtual path. The PC 230 in FIG. 4 is provisioned to a different DSP and will have its own ATM virtual path allowing both DSPs to operate independently over the same shared physical VDSL drop to a single CPE data device. Advantageously, security is under control of the DSP along with the IP address assignments, which are under the control of each DSP.

Figure 6:
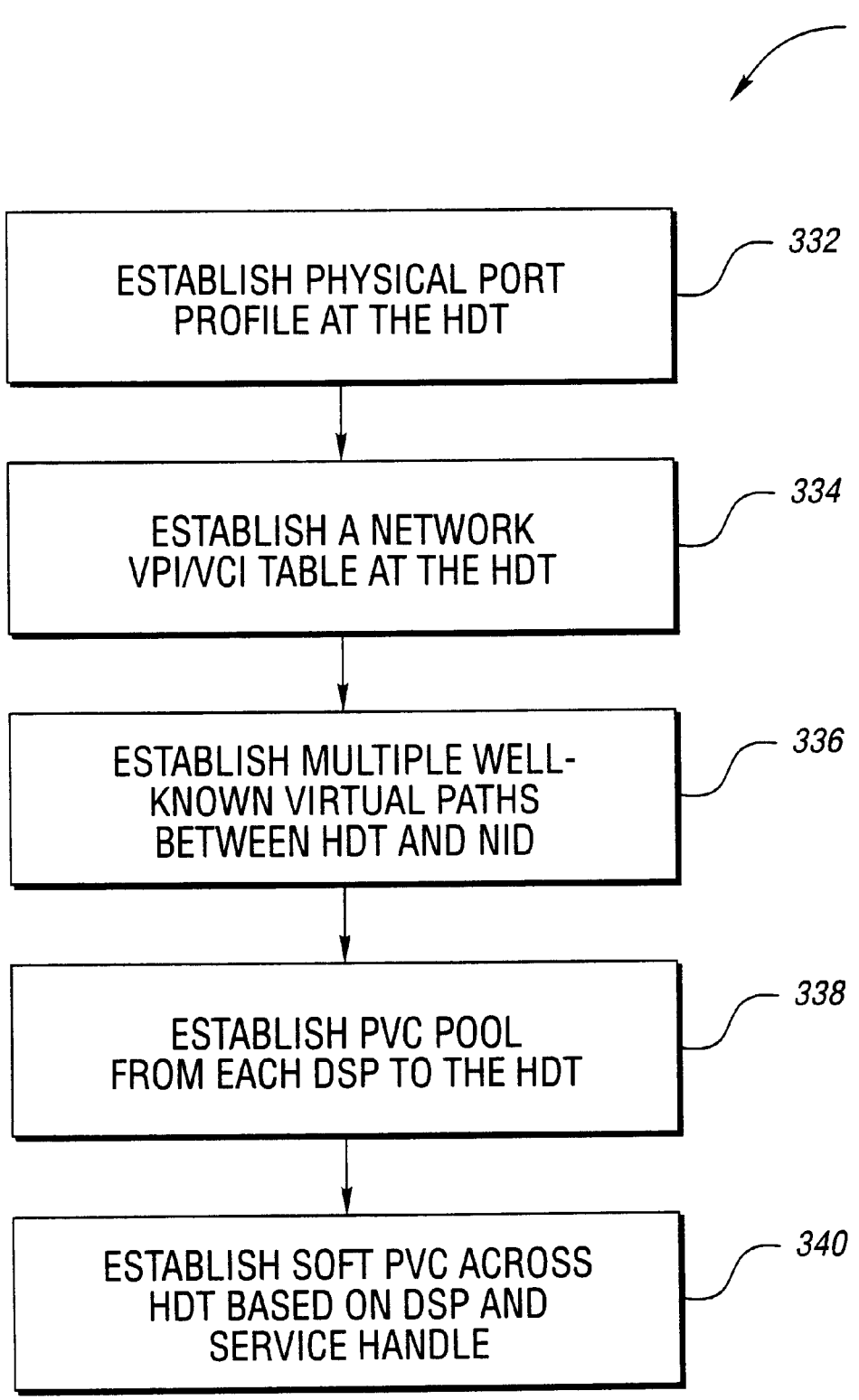
FIG. 6 is a block diagram illustrating a preferred method of the present invention for utilizing well-known virtual paths to provide multiple services over a single physical drop.

Referring to FIG. 6, a preferred method of the present invention for utilizing well-known virtual paths to provide multiple services over a single physical drop is generally indicated at 330. At block 332, a physical port profile is established at the host digital terminal (HDT). At block 334, a network virtual path identifier/virtual cannel identifier (VPI/VCI) table is established at the host digital terminal (HDT). The physical port profile and the network VPI/VCI table, in a preferred form, are illustrated in FIG. 5. At block 336 of FIG. 6, multiple well-known virtual paths (defined by VPI/VCI as described previously) between the host digital terminal (HDT) and the network interface device (NID) are established. At block 338, a permanent virtual circuit (PVC) pool is established from each data service provider (DSP) to the host digital terminal (HDT).

When a customer premise equipment (CPE) is attached to a 10 Base T interface at the residence/business, it attempts to log on to the network, a soft PVC is established across the HDT. That is, the entry in the physical port profile at the HDT corresponding to the CPE device that is logging on specifies a particular DSP and service handle. Accordingly, the DSP has a PVC pool for that same service handle, and the soft PVC across the HDT is established between the well-known virtual path (VPI/VCI) and the (preferably first) available network path (VPI/VCI) in the PVC pool.

It is to be appreciated that embodiments of the present invention provide private-line-like service between the customer CPE data device and the DSP. Each DSP may have total control of its services. Further, the DSP will have control of the security and IP address issues. The DSP has PVCs provisioned in the ATM network VPI/VCI table using unique service handle identifiers. A service handle identifier is a single value for each PVC pool. Each PVC pool may support different data rates, for example, 256 kilobits per second for one pool and one megabit per second for another. Customer subscription to a DSP pool is provisioned in the customer physical port profile in the HDT, and includes the DSP PVC pool service handle. Multiple data service providers (DSP) on the same physical port may be identified with multiple service handles in the customer physical port profile. In accordance with the present invention, each CPE data device may support different DSP as long as they are on different ports. The customer physical port profile provision for each data device port is located at the customer serving HDT.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for providing broadband data service to a user site, the system comprising:

a plurality of data devices;

a network interface at the user site;

a customer premise equipment device at the user site having a single connection to the network interface and providing multiple connections to the plurality of data devices over multiple physical connections; and a host digital terminal for connecting to an asynchronous transfer mode (ATM) network that is connected to a plurality of data service providers, the host digital terminal communicating with the network interface and being configured to establish a plurality of ATM first virtual paths over the single physical drop between the host digital terminal and the network interface;

wherein the host digital terminal is configured such that for each ATM first virtual path, the host digital terminal is operative to establish a corresponding ATM network virtual path over the ATM the network to a corresponding data service provider, and to establish a permanent virtual circuit between that ATM first virtual path and the corresponding ATM network virtual path, and wherein the host digital terminal has information stored therein representing a physical port profile, the profile including a plurality of entries corresponding to the plurality of ATM first virtual paths, each profile entry indicating a data service provider and a service handle to associate each ATM first virtual path with a corresponding data device and data service provider, the customer premise equipment device providing communication between each data device and the corresponding ATM first virtual path, wherein each data device is configured to communicate with the corresponding data service provider using Internet protocol (IP) over ATM virtual path to allow private IP address assignments from the data service providers to the corresponding data devices over the single physical drop to the user site.

2. The system of claim 1 further comprising:

an optical network unit;

a fiber connecting the host digital terminal to the optical network unit; and a digital subscriber line connecting the optical network unit to the network interface.

3. The system of claim 2 wherein the digital subscriber line is a very-high bit rate digital subscriber line.

4. The system of claim 1 further comprising:

a fiber connecting the host digital terminal to the network interface.

5. The system of claim 1 wherein the host digital terminal further has information stored therein representing a network virtual path table, the table including a plurality of entries, each table entry indicating a data service provider, a service handle, and at least one corresponding network virtual path.

6. The system of claim 5 wherein the permanent virtual circuit between a first virtual path and the corresponding network virtual path is established when the data service provider and the service handle in the corresponding profile entry are the same as the data service provider and the service handle in the corresponding table entry.

7. The system of claim 6 wherein at least one data device is a utility meter.

8. A method for providing broadband data service to a user site in which a host digital terminal is connected to an asynchronous transfer mode (ATM) network connected to a plurality of data service providers, and the host digital terminal being in communication with a network interface over a single physical drop to the user site and a customer premise equipment device at the user site having a single connection to the network interface and providing multiple connections to a plurality of data devices over multiple physical connections, the method comprising:

establishing a plurality of ATM first virtual paths between the host digital terminal and the network interface such that the plurality of data service providers may communicate with the network interface along different ATM first virtual paths;

establishing a plurality of permanent ATM virtual circuit pools, each pool connecting a corresponding data service provider to the host digital terminal, and each pool including at least one ATM virtual network path; and establishing a physical port profile, the profile including a plurality of entries corresponding to the plurality of ATM first virtual paths, each profile entry indicating a data service provider and a service handle to associate each ATM first virtual path with a corresponding data device and data service provider, the customer premise equipment device providing communication between each data devise and the corresponding ATM first virtual path, wherein each data device configured to communicate with the corresponding data service provider using Internet protocol (IP) over ATM virtual path to allow private IP address assignments from the data service providers to the corresponding data devices over the single physical drop to the user site.

9. The system of claim 8 further comprising:

establishing a network virtual path table, the table including a plurality of entries, each table entry indicating a data service provider, a service handle, and at least one corresponding permanent virtual circuit pool.

10. The method of claim 9 further comprising:

establishing a permanent virtual circuit between a first virtual path and the corresponding permanent virtual circuit pool when the data service provider and the service handle in the corresponding profile entry are the same as the data service provider and the service handle in the corresponding table entry.

11. The method of claim 10 wherein establishing the permanent virtual circuit further comprises:

establishing the permanent virtual circuit between the first virtual path and a first available network virtual path of the corresponding permanent virtual circuit pool.

\* \* \* \* \*